United States Patent
Egami et al.

(10) Patent No.: US 6,801,842 B2
(45) Date of Patent: Oct. 5, 2004

(54) ACCESSORY EQUIPMENT DRIVING DEVICE FOR VEHICLE

(75) Inventors: Tsuneyuki Egami, Gamagori (JP); Takeshi Sawada, Gifu (JP)

(73) Assignee: Denso Corporation, Kariya (JP)

( * ) Notice: Subject to any disclaimer, the term of this patent is extended or adjusted under 35 U.S.C. 154(b) by 68 days.

(21) Appl. No.: 10/101,610

(22) Filed: Mar. 21, 2002

(65) Prior Publication Data
US 2002/0147531 A1 Oct. 10, 2002

(30) Foreign Application Priority Data
Apr. 10, 2001 (JP) ........................................ 2001-111054

(51) Int. Cl.[7] .............................. F16D 43/14; F16H 1/20; B60K 6/04
(52) U.S. Cl. .................... 701/36; 701/102; 290/40 A
(58) Field of Search ........................ 701/36, 102, 110; 290/40 C, 40 A, 40 B, 40 D, 40 F; 180/65.2, 65.3, 65.6; 475/5, 149, 54, 136, 146, 148

(56) References Cited

U.S. PATENT DOCUMENTS

| | | | | |
|---|---|---|---|---|
| 3,941,225 A | * | 3/1976 | Shiber | .................... 192/104 C |
| 4,297,907 A | * | 11/1981 | Bossler, Jr. et al. | .......... 74/417 |
| 4,454,786 A | * | 6/1984 | Stockton | ....................... 74/688 |
| 5,730,676 A | * | 3/1998 | Schmidt | ......................... 475/5 |
| 5,896,750 A | | 4/1999 | Karl | ............................. 62/236 |
| 5,934,396 A | * | 8/1999 | Kurita | ....................... 180/65.2 |
| 5,991,683 A | * | 11/1999 | Takaoka et al. | ............ 701/102 |
| 6,201,312 B1 | * | 3/2001 | Shioiri et al. | ............. 290/40 C |
| 6,269,895 B1 | | 8/2001 | Tanuguchi et al. | ......... 180/65.2 |

FOREIGN PATENT DOCUMENTS

| | | |
|---|---|---|
| EP | 0 916 546 A2 | 5/1999 |
| EP | 0 930 185 A1 | 7/1999 |
| JP | A 2000-229516 | 8/2000 |

* cited by examiner

Primary Examiner—Tan Q. Nguyen
Assistant Examiner—Dalena Tran
(74) Attorney, Agent, or Firm—Oliff & Berridge, PLC

(57) ABSTRACT

Three shafts of a planetary gear mechanism, which is a torque distribution mechanism, are connectable to an engine, a motor-generator and a compressor, respectively. An engine connecting shaft, a motor-generator connecting shaft and an accessory equipment connecting shaft are connected to a ring gear, a carrier and a sun gear, respectively. A single motor-generator can perform four different operations: a compressor driving operation when an idle stop function is performed, an engine starting operation by the motor-generator, a motor-generator driving operation by the engine, motor-generator driving and compressor driving operations by the engine.

9 Claims, 1 Drawing Sheet

| MODE | (I) STARTER | (II) ONLY ALTER. | (III) ELEC. A/C | (IV) NORM. ALTER. A/C |
|---|---|---|---|---|
| ENGINE | HALT | RUN | HALT | RUN |
| CLUTCH | OFF | OFF | OFF | ON |
| LOCK | ON | ON | OFF | OFF |

ACCESSORY EQUIPMENT DRIVING DEVICE FOR VEHICLE

CROSS REFERENCE TO RELATED APPLICATION

This application is based on and incorporates herein by reference Japanese Patent Application No. 2001-111054 filed on Apr. 10, 2001.

BACKGROUND OF THE INVENTION

The present invention relates to an accessory equipment driving device for a vehicle.

As a technology to improve fuel economy, a vehicle having an idle stop function that stops an engine at idle is proposed. In this type of vehicle, the idle stop function is canceled in order to drive a compressor for an air conditioner by the engine. Therefore, the idle stop function is not fully effective.

To counter this problem, a hybrid-compressor with an integrated motor is proposed in JP-A-2000-229516. This hybrid-compressor is driven by the engine when the engine is running. When the engine is not running, the compressor is disconnected from the engine and driven by the motor. To disconnect the compressor from the engine, a clutch mechanism, such as a one-way clutch or a clutch, is required. In other word, a motor and its driving control circuit, and a clutch mechanism are required. This increases complexity of configuration and a cost. Moreover, additional electrical circuits, such as an inverter circuit, to control a driving operation of the compressor are required.

Here, a power generating system (rotary electric machine and electrical circuit) can be simplified with a configuration in which the motor is driven to generate electricity.

An ideal condition of connections among the engine, rotary electric machine, and compressor for an air conditioner will be analyzed.

When the engine is started, the engine and the rotary electric machine need to be connected, and the compressor is better not to be connected with the engine nor the rotary electric machine (motor operation).

When the engine is running with the air conditioner off, the engine and the rotary electric machine need to be connected, and the compressor is better not to be connected with the engine nor the rotary electric machine (motor operation).

When the engine is running with the air conditioner on, the engine, the rotary electric machine, and the compressor need to be connected.

When the idle stop function is performed, the engine is better not to be connected with the rotary electric machine nor the compressor, and the rotary electric machine and the compressor need to be connected so that proper operations of the air conditioner are ensured.

In the accessory equipment driving device for a vehicle having an idle stop function, these connections need to be accomplished with simple configuration.

SUMMARY OF THE INVENTION

The present invention has an objective to provide an accessory equipment driving device for a vehicle with high installability to a vehicle, simple system configuration, and good cost efficiency.

An accessory equipment driving device for a vehicle of the present invention makes connections among an engine having an idle stop function, a motor-generator for a power generating operation and a motor operation, and accessory equipment such as a compressor for an air conditioner.

This device is for driving the accessory equipment by the engine when the engine is running, and by the motor-generator when the engine is idle. The device has an engine connecting shaft, a motor-generator connecting shaft, an accessory equipment connecting shaft. The shafts are to be connected to the engine, the motor-generator, and the accessory equipment, respectively.

The device has a torque distribution mechanism. This mechanism is for distributing engine torque inputted through the engine connecting shaft to the motor-generator connecting shaft and accessory equipment connecting shaft. It is also for transferring torque inputted through the motor-generator connecting shaft to the engine connecting shaft.

The device has a locking mechanism which locks the accessory equipment connecting shaft, and a clutch which disengageably connects the motor-generator connecting shaft of the torque distribution mechanism with the accessory equipment connecting shaft.

According to the above configuration, a single motor-generator can perform four different operations: a driving operation of the compressor when the idle stop function is performed, a starting operation of the engine by the motor-generator, a driving operation of the motor-generator by the engine, and a driving operation of both motor-generator and the compressor by the engine. Therefore, the motor-generator and its driving circuit can be integrated, and the configuration can be simplified.

Moreover, a motor-generator/accessory equipment system which consists of the compressor, motor-generator, torque distribution mechanism, clutch and locking mechanism can be separately placed from the engine. Therefore, a total shaft length of the engine can be reduced. This improves arrangement flexibility in an engine compartment, resulting in improved installability of the device, especially in small vehicles.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figures 1, 2:
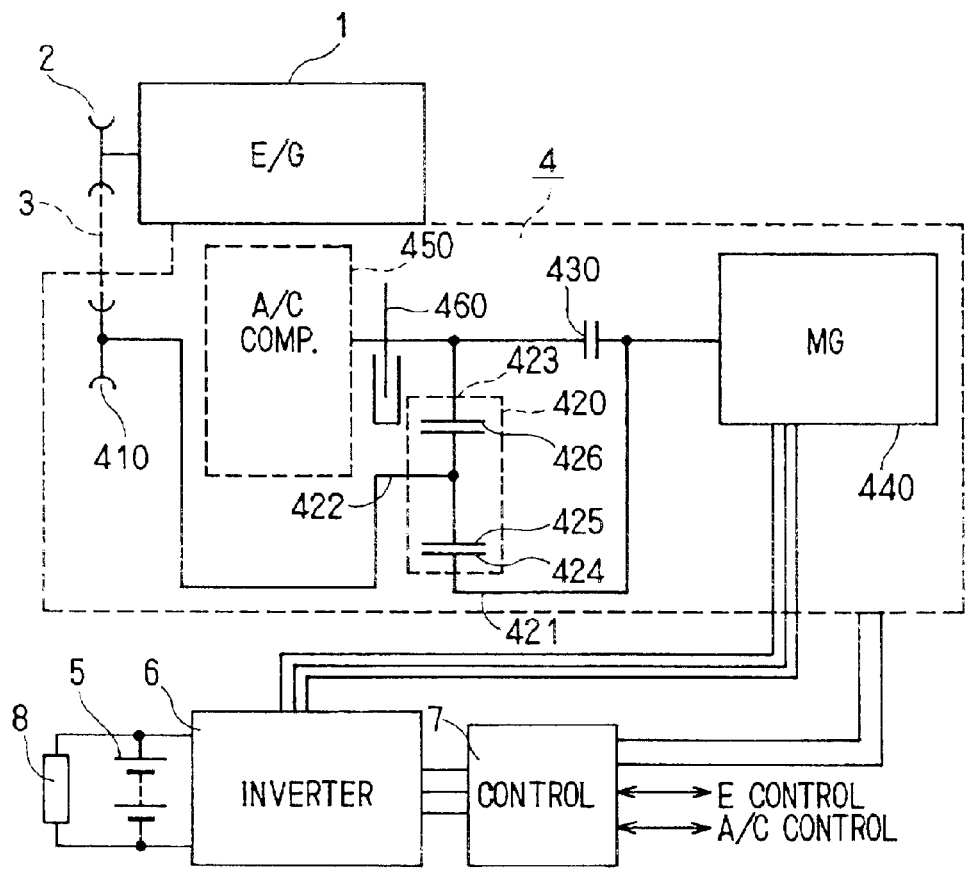
FIG. 1 is a block diagram of an accessory equipment driving device according to the embodiment.
FIG. 2 is an operation mode diagram showing operation modes of the accessory equipment driving device of FIG. 1.

The preferred embodiment of the present invention will be explained with reference to the accompanying drawings.

Referring to FIG. 1, the configuration and operation of the accessory equipment driving device for a vehicle of this embodiment is discussed.

An internal combustion engine 1 has an idle stop function. The engine 1 is stopped during idling. A crank pulley 2 has a belt 3 for transferring a driving power generated by the engine 1 to other devices. A motor-generator/accessory equipment system 4 will be explained later. An electricity storing device 5, such as a secondary battery, stores electricity. A three-phase inverter 6 has a DC-AC bidirectional conversion function. It mediates between the electricity storing device 5 and the motor-generator/accessory equipment system 4 for power transfer.

A control device 7 sets a mode to a starter mode, an alternator mode, an electrical compressor mode, or an internal combustion engine driven compressor mode. The mode is determined based on information provided by an internal combustion engine control device or an air-conditioner control device, which are not shown in figures. The control device 7 controls the inverter 6, clutch 430 of the motor-generator/accessory equipment system, and locking mechanism 460. An electrical load 8 receives a power from the electricity storing device 5.

The motor-generator/accessory equipment system 4 includes an input pulley 410 connected to the crank pulley 2 of the engine 1 by the belt 3. A planetary gear mechanism 420 refers to the torque distribution mechanism of this embodiment. It includes the first shaft 421, second shaft 422, third shaft 423 and ring gear 424. The ring gear 424 is fixed to the first shaft 421, and the first shaft 421 is directly connected to a rotor shaft of the motor-generator 440. A carrier 425 is fixed to the second shaft 422, and the second shaft 422 is directly connected to the input pulley 410. The third shaft 423 is connected to the first shaft 421 via the clutch 430 and to the compressor 450 for an air conditioner via the locking mechanism 460.

In the planetary gear mechanism 420, the sun gear and ring gear are engaged with the planet gears. The planet gears are supported by the carrier 425 as they rotate their own axes. The carrier 425 is rotated as the planet gears revolve around the sun gear 426.

Since the third shaft 423 of the planetary gear mechanism is connected to one of the shafts of the locking mechanism 460 and that of the clutch 430, the clutch 430 and locking mechanism 460 can be integrated. Likewise, the clutch 430 and planetary gear mechanism 420, or the clutch 430, locking mechanism and planetary gear mechanism can be integrated.

Moreover, the motor-generator 440 and clutch 430, or the locking mechanism and compressor 450 can be integrated. A rotary electric machine which a planetary gear mechanism is integrated can be used for the planetary gear mechanism 420 and motor-generator 440. Furthermore, the clutch 430, locking mechanism 460, and compressor 450 can be connected or integrated to the motor-generator.

A driveline device includes the planetary gear mechanism 420, clutch 430, and locking mechanism 460. In this device, whether simultaneously rotating the second shaft 422 and the third shaft 423 of the planetary gear mechanism 430, or independently rotating them is determined. Conventional electromagnetic or hydraulic clutch can be used for the clutch 430.

Although a synchronous motor-generator is used for the motor-generator 440, other types of motor-generator can be used as long as a selection between the power generating operation and motor operation is available. The compressor 450 is a conventional compressor for an automobile air conditioner. The locking mechanism 460 may be a conventional braking mechanism.

(I) Engine Starting Mode

When restarting the engine 1 after it stopped by the idle stop function, the clutch 430 is released (disconnected) and the locking mechanism 460 is locked.

This stops rotations of the third shaft 423 and the sun gear 426 of the planetary gear mechanism 420. A rotor shaft of the motor-generator 440 is mechanically connected to the input pulley 410 via the ring gear 424 and the carrier 425 of the planetary gear mechanism 420 one after another. The control device 7 controls the inverter 6 so that the motor-generator 440 performs a motor operation to provide the engine 1 with starting torque. The number of rotations of the carrier 425 is smaller than that of the ring gear 424; therefore, the electrical torque of the motor-generator 440 is multiplied and large starting torque is provided to the engine 1.

(II) Power Generating Mode During Halting of Compressor

When a starting operation of the engine 1 is completed, the control device 7 controls the inverter 6 so that the motor-generator 440 performs a power generating operation. A power generated by the motor-generator 440 is rectified by the inverter 6, and charged into the electricity storing device 5. A power is supplied to the electrical load 8. At this moment, the clutch 430 is released, the locking mechanism 460 is locked, and the compressor 450 is stopped.

(III) Compressor Driving Mode During Idle Stop

When driving the compressor 450 to drive an air conditioner while the engine 1 is not running, the clutch 430 and the locking mechanism 460 are released, and the motor-generator 440 performs a motor operation. This disables the second shaft 422 of the planetary gear mechanism 420 to rotate due to a friction of the engine 1. As a result, the torque of the motor-generator 440 is transferred from the ring gear 424 to the compressor 450 via the sun gear 426 and the third shaft 423 of the planetary gear mechanism 420. The control device 7 drives the inverter 6 and supplies an alternating current to the motor-generator 440 so that torque necessary for rotating the compressor 450 is generated.

(IV) Compressor Driving Mode During Running of Engine

When the engine 1 is running, the motor-generator 440 performs a power generating operation as described above. At this time, the clutch 430 is engaged and the locking mechanism 460 is released to drive the compressor 450. By this operation, the first shaft 421 and third shaft 423 of the planetary gear mechanism have the same number of rotations. Therefore, the motor-generator 440 and compressor 450 are driven at the same speed as a result of the engine rotation.

"STARTER," "ONLY ALTER.," "ELEC. A/C" and "NORM. ALTER., A/C" in the table of FIG. 2 corresponds to the "Engine Starting Mode," "Power Generating Mode during Halting of Compressor," "Compressor Driving Mode During Idle Stop" and "Compressor Driving Mode During Running of Engine" which are discussed above, respectively.

The present invention should not be limited to the embodiment previously discussed and shown in the figures, but may be implemented in various ways without departing from the spirit of the invention.

For example, the planetary gear mechanism 420 is used for a torque distribution mechanism in the above embodiment. However, a differential gear mechanism can be used. Other types of planetary gear mechanism can be used for the planetary gear mechanism 420. For the clutch mechanism, any two of the first to third shafts of the planetary gear mechanism 420 instead of the first and third shafts can be connectable.

What is claimed is:

1. An accessory equipment driving device for a vehicle, which makes connections among an engine having an idle stop function, a motor-generator for a power generating operation and a motor operation, and an accessory equipment so that the accessory equipment is driven by the engine when the engine is running and by the motor-generator when the idle stop function is performed, comprising:

a torque distribution mechanism including an engine connecting shaft connectable to the engine, a motor-generator shaft connectable to the motor-generator, and an accessory equipment connecting shaft connectable to the accessory equipment, the torque distribution mechanism being for distributing engine torque inputted through the engine connecting shaft to the motor-generator connecting shaft and the accessory equipment connecting shaft, and transferring torque inputted from the motor-generator connecting shaft to the engine connecting shaft;

a locking mechanism which locks the accessory equipment connecting shaft; and a clutch which disengageably connects the motor-generator connecting shaft of the torque distribution mechanism with either one of the accessory equipment connecting shaft and the engine connecting shaft.

2. The accessory equipment driving device for a vehicle as in claim 1, wherein the accessory equipment includes a compressor for an air conditioner driven even at a time of the idle stop function.

3. An accessory equipment driving device for a vehicle which makes connections among an engine having an idle stop function, a motor-generator for a power generating operation and a motor operation, and an accessory equipment including a compressor for an air conditioner driven even at a time of the idle stop function, so that the accessory equipment is driven by the engine when the engine is running and by the motor-generator when the idle stop function is performed, comprising:

a torque distribution mechanism including an engine connecting shaft connectable to the engine, a motor-generator shaft connectable to the motor-generator, and an accessory equipment connecting shaft connectable to the accessory equipment, the torque distribution mechanism being for distributing engine torque inputted through the engine connecting shaft to the motor-generator connecting shaft and the accessory equipment connecting shaft, and transferring torque inputted from the motor-generator connecting shaft to the engine connecting shaft;

a locking mechanism which locks the accessory equipment connecting shaft; and a clutch which disengageably connects the motor-generator connecting shaft of the torque distribution mechanism with either one of the accessory equipment connecting shaft and the engine connecting shaft, wherein the torque distribution mechanism includes a planetary gear mechanism.

4. An accessory equipment driving device for a vehicle as in claim 3, wherein the planetary gear mechanism has a carrier, a ring gear and a sun gear, and wherein the engine connecting shaft, the motor-generator connecting shaft, and the accessory equipment connecting shaft are connected to the carrier, the ring gear and the sun gear, respectively.

5. An accessory equipment driving device for a vehicle as in claim 4, further comprising a control device which connects the clutch only when the compressor is driven by the engine, and locks the locking mechanism when the engine is started or when the motor-generator is driven by the engine under a condition in which the compressor, which is the accessory equipment for an air conditioner, is not driven.

6. An accessory equipment driving device for a vehicle having an engine with an idle stop function, which comprises an accessory equipment driven by either one of the an engine and a motor-generator, comprising:

a torque distribution mechanism including first, second and third shafts that are connectable to the motor-generator, the engine and the accessory equipment, respectively;

a clutch mechanism connecting any two of the three shafts; and a locking mechanism locking the third shaft, wherein the torque distribution mechanism includes a planetary gear mechanism.

7. The accessory equipment driving device for a vehicle as in claim 6, wherein the accessory equipment comprises a compressor mechanism driven by either one of the engine and the motor-generator.

8. An electrical equipment driving device for a vehicle having an engine with an idle stop function, a motor-generator and an accessory equipment driven by either one of the engine and a motor-generator, comprising:

a torque distribution mechanism including first, second and third shafts connectable to the motor-generator, the engine and the accessory equipment, respectively;

a clutch mechanism disengageably connecting the first shaft and the third shaft in parallel with the torque distribution mechanism;

a locking mechanism locking and unlocking the third shaft to the accessory equipment; and a control device for electrically controlling the clutch mechanism and the locking mechanism in correspondence with operations of the engine and the accessory equipment, wherein the torque distribution mechanism includes a planetary gear mechanism.

9. The electrical equipment driving device for a vehicle as in claim 8, wherein the accessory equipment comprises a compressor mechanism.

* * * * *